(12) United States Patent
Nelson

(10) Patent No.: US 10,933,484 B2
(45) Date of Patent: Mar. 2, 2021

(54) ENGINE-DRIVEN WELDING-TYPE POWER SUPPLIES CONFIGURED TO SIMULTANEOUSLY USE EXTERNAL AND ENGINE POWER

(71) Applicant: Illinois Tool Works Inc., Glenview, IL (US)

(72) Inventor: Jonathon Nelson, Menasha, WI (US)

(73) Assignee: Illinois Tool Works Inc., Glenview, IL (US)

(*) Notice: Subject to any disclaimer, the term of this patent is extended or adjusted under 35 U.S.C. 154(b) by 534 days.

(21) Appl. No.: 15/692,023

(22) Filed: Aug. 31, 2017

(65) Prior Publication Data

US 2019/0061037 A1 Feb. 28, 2019

(51) Int. Cl.
*B23K 9/10* (2006.01)
*B23K 9/32* (2006.01)
*F02B 63/04* (2006.01)

(52) U.S. Cl.
CPC .......... *B23K 9/1043* (2013.01); *B23K 9/1006* (2013.01); *B23K 9/327* (2013.01); *F02B 63/04* (2013.01)

(58) Field of Classification Search
CPC .. B23K 9/1006; B23K 9/1012; B23K 9/1043; B23K 9/1056; B23K 9/1062; B23K 9/1075; B23K 9/1081; B23K 9/1087; B23K 9/1336; B23K 9/32; B23K 9/323; B23K 9/327; F02B 63/04; F02B 63/048; F02B 63/06
USPC .............. 219/130.1, 133, 134, 136, 137 PS, 219/137.63, 137.9
See application file for complete search history.

(56) References Cited

U.S. PATENT DOCUMENTS

| | | | |
|---|---|---|---|
| 2,618,775 A | 11/1952 | Shay | |
| 6,348,671 B1 | 2/2002 | Fosbinder et al. | |
| 6,818,860 B1 | 11/2004 | Stava | |
| 8,785,817 B2 | 7/2014 | Luck | |
| 2005/0224478 A1 | 10/2005 | Stropki | |
| 2006/0027547 A1* | 2/2006 | Silvestro | B23K 9/323 219/133 |

(Continued)

FOREIGN PATENT DOCUMENTS

DE 9401171 6/1994

OTHER PUBLICATIONS

PipePro 304, Owner's Manual, Miller The Power of Blue, OM-492 Feb. 2001 (64 pages).

(Continued)

*Primary Examiner* — Hung D Nguyen
(74) *Attorney, Agent, or Firm* — McAndrews, Held & Malloy, Ltd.

(57) ABSTRACT

An engine-driven welding power supply, comprising a frame, an engine attached to the frame, and a generator attached to the frame. The generator is driven by the engine and configured to output electrical power via an electrical receptacle. Weld power conversion circuitry is integrally attached to the frame and configured to output welding-type power. A power conductor configured to provide input power to the weld conversion circuitry is configured to be manually coupled to the electrical receptacle or to an external source of electrical power. The weld power conversion circuitry is configured to convert the input power received via the power conductor to welding-type power.

18 Claims, 8 Drawing Sheets

(56) References Cited

U.S. PATENT DOCUMENTS

| | | |
|---|---|---|
| 2008/0073330 A1* | 3/2008 | Diedrick ................ B23K 9/32 219/133 |
| 2008/0308541 A1 | 12/2008 | Hiroi |
| 2010/0060015 A1 | 3/2010 | Buker |
| 2011/0017717 A1 | 1/2011 | Farah |
| 2011/0073569 A1 | 3/2011 | Rappl |
| 2011/0220616 A1 | 9/2011 | Mehn |
| 2011/0309053 A1 | 12/2011 | Baus |
| 2016/0098051 A1 | 4/2016 | Enyedy |
| 2017/0036291 A1 | 2/2017 | Enyedy |

OTHER PUBLICATIONS

Field Instructions for Dual Power Kit 195 275 in PipePro 304 Models Effective with Serial No. LC649059 and Following, Form: F216 358B, Mar. 2007, Miller Electric Mfg. Co., 2007, (9 pages).
Int'l Search Report and Written Opinion Appln No. PCT/US017/058700 dated Feb. 21, 2018 (13 pgs).

* cited by examiner

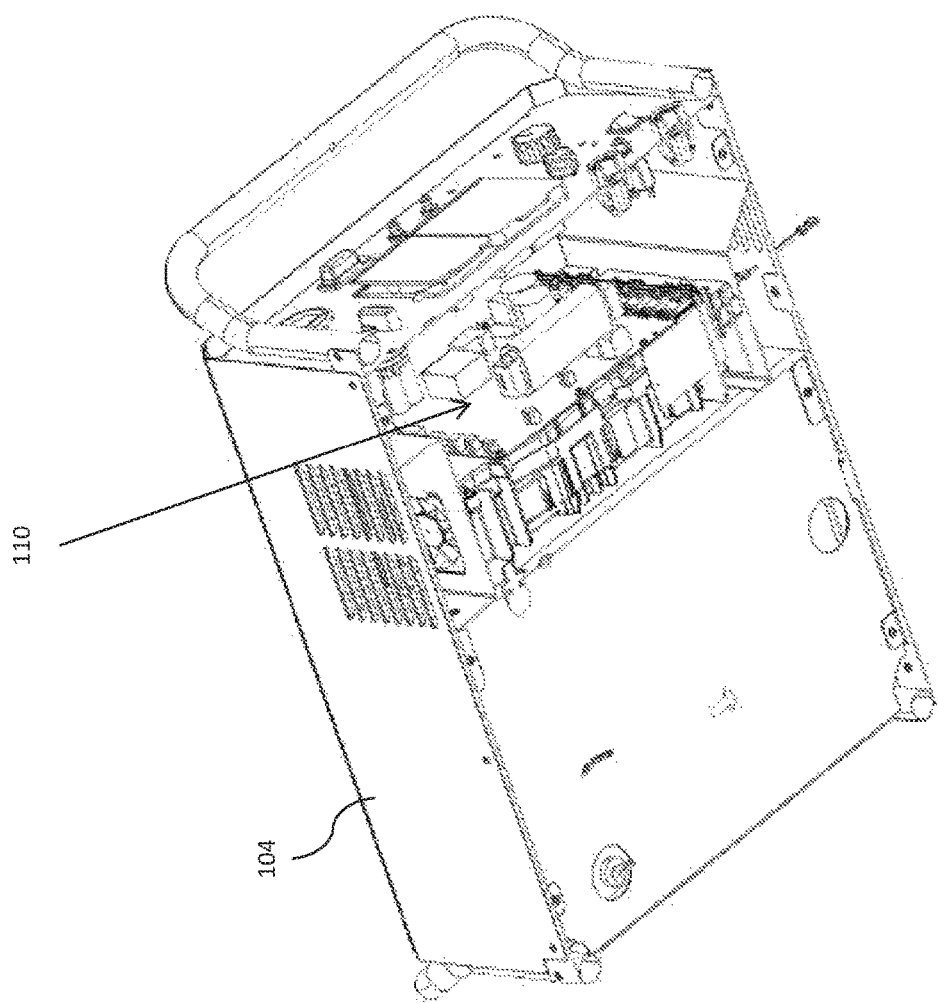

US 10,933,484 B2

ENGINE-DRIVEN WELDING-TYPE POWER SUPPLIES CONFIGURED TO SIMULTANEOUSLY USE EXTERNAL AND ENGINE POWER

TECHNICAL FIELD

The present disclosure relates to engine-driven welding-type power supplies and, more particularly, to engine-driven welding-type power supplies configured to simultaneously use external and engine power.

BACKGROUND

Engine-driven generator welding power supplies are sometimes portable. Accordingly, they are sometimes used where utility power is unavailable (e.g. outdoors). Other times they are used where utility power is available (e.g. indoors).

SUMMARY

Engine-driven welding-type power supplies configured to simultaneously use external and engine power are disclosed, substantially as illustrated by and described in connection with at least one of the figures, as set forth more completely in the claims.

DESCRIPTION OF THE DRAWINGS

These and other advantages of the present disclosure may be readily understood with the reference to the following specifications and attached drawings wherein:

FIG. 1b is a side view of the engine-driven welding-type power supply of FIG. 1a.

FIG. 1c is a cross section of the housing of the engine-driven welding-type power supply of FIG. 1a, viewed from below.

FIG. 2 is a block diagram illustrating the components of the engine-driven welding-type power supply of FIG. 1a.

FIGS. 3 and 4 are block diagrams illustrating the components and connections of the engine-driven welding-type power supply of FIG. 1a.

DETAILED DESCRIPTION

Figure 1A:
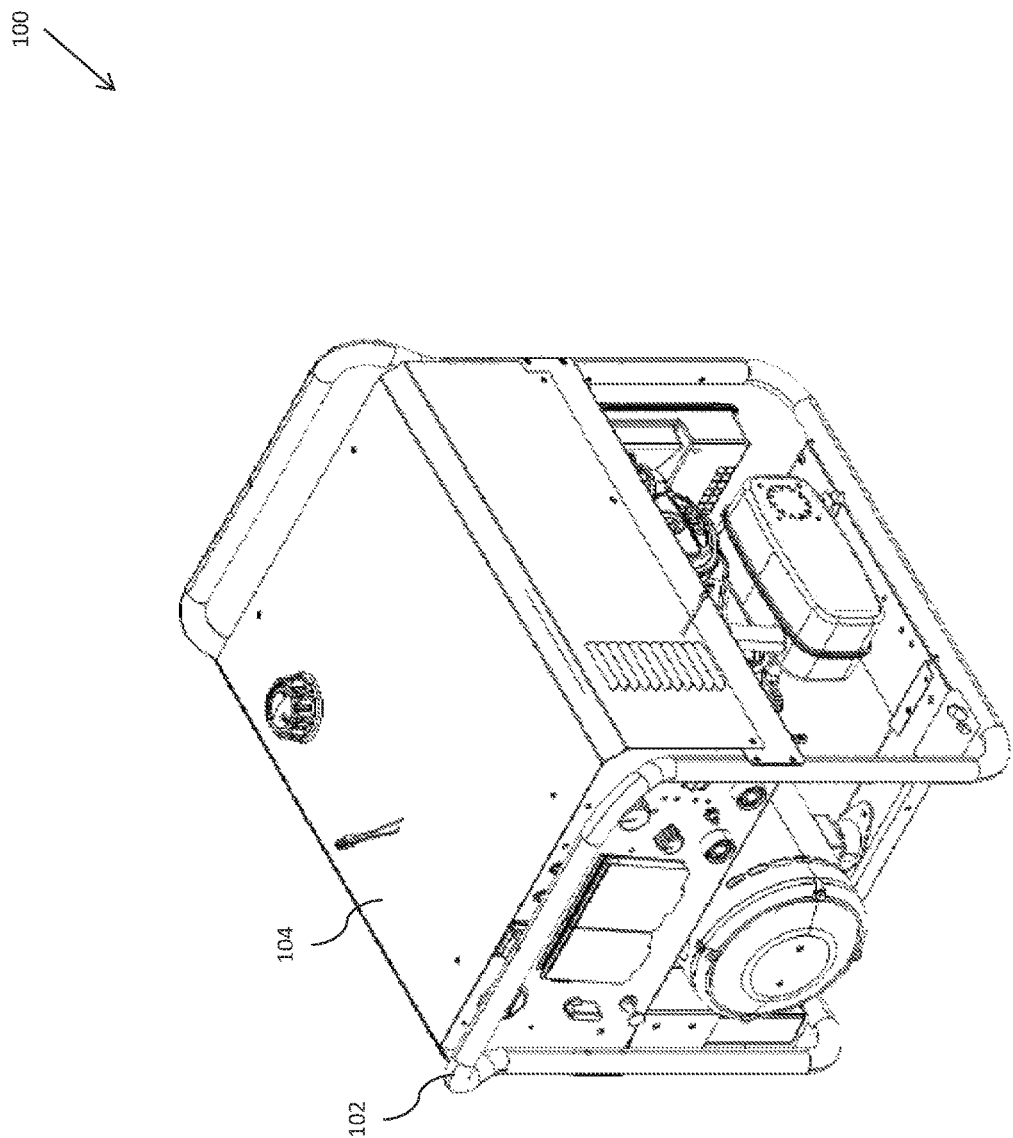
FIG. 1a is a perspective view of an engine-driven welding-type power supply in accordance with the present disclosure.

Preferred embodiments of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g." and "for example" set off lists of one or more non-limiting examples, instances, or illustrations.

As utilized herein the terms "circuit(s)" and "circuitry" refer to analog and/or digital components, power or control elements, and/or a microprocessor, DSP, software, etc., and discrete or integrated components, or portions and combinations thereof.

Converter circuitry, as used herein, includes a power circuit that receives or provides an alternating current (AC) or direct current (DC) signal, and converts it to the other of an AC or DC signal, and/or to a different frequency.

As used herein, the term "coupled" means attached, affixed, connected, joined, fastened, linked, and/or otherwise secured.

As used herein, the terms "engine-driven welding power supply" and "engine-generator" refer to a welding power supply that is powered by an engine and a generator. Example engines are internal combustion engines and diesel engines.

Welding-type power, as used herein, refers to power suitable for welding, plasma cutting, induction heating, CAC-A and/or hot wire welding/preheating (including laser welding and laser cladding).

As used herein, the term "substantially" means mostly, largely, and/or considerably, such that small and/or reasonably minor exceptions and/or deviations may remain within the scope of contemplation.

Disclosed example engine-driven welding power supplies include a frame, an engine attached to the frame, a generator attached to the frame, weld power conversion circuitry integrally attached to the frame, and a power conductor configured to provide input power to the weld conversion circuitry. The generator is driven by the engine and configured to output electrical power via an electrical receptacle. The weld power conversion circuitry is configured to output welding-type power. The power conductor is configured to be manually coupled to the electrical receptacle or to an external source of electrical power. The weld power conversion circuitry is configured to convert the input power received via the power conductor to the welding-type power.

In some examples, the generator is configured to output the electrical power as alternating current (AC) electrical power having a first voltage. In such an example, the weld power conversion circuitry comprises an input power conversion circuit configured to convert the electrical power received via the power conductor to a bus voltage if the received electrical power is within a voltage range. In some examples, the first voltage is at least one of 100V AC, 115V AC, 200V AC, 208V ACT, 230V AC, 380V AC, 400V AC, 440V AC, 460V AC, or 575V AC.

In some examples, the generator is configured to output the electrical power via the electrical receptacle to a second device while the power conductor is coupled to the external source of electrical power. In some examples, the weld power conversion circuitry comprises a switched mode power supply. In some examples, the power conductor comprises a cable and a physical plug configured to be plugged into the electrical receptacle or plugged into a receptacle for the external source of electrical power. In some examples, the power conductor is configured to be coupled to at least one of the electrical receptacle or the receptacle for the external source of electrical power via a plug adapter. In some examples, the plug adapter may be configured for single phase or three phase power. In some examples, the power conductor is configured to be manually coupled to the electrical receptacle, the welding power supply further comprising a second power conductor configured to be manually coupled to the external source of electrical power.

A disclosed apparatus for powering a welding tool, includes a frame, an engine attached to the frame, a generator attached to the frame, and weld power conversion circuitry integrally attached to the frame. The generator is driven by the engine and configured to output electrical power via a first electrical receptacle. The weld power conversion circuitry is configured to convert the electrical power to output welding-type power. The electrical power is received via an electrical plug when the electrical plug is coupled to the first electrical receptacle of the generator. The electrical power is received from an external power supply via a second electrical receptacle when the electrical plug is coupled to the second electrical receptacle.

In some examples, the generator is configured to output the electrical power to an external device when the external device is electrically connected to the first electrical receptacle and the electrical plug is coupled to the second electrical receptacle. In some examples, the electrical plug is coupled to the second electrical receptacle via a plug adapter. In some examples, the electrical plug is coupled to the first electrical receptacle via a plug adapter. In some examples, the external device is connected to the first electrical receptacle via a plug adapter. In some examples, the weld power conversion circuitry comprises a switched mode power supply. In some examples, the electrical power is received by the weld power conversion circuitry from the electrical plug via a conductor. In some examples, the weld power conversion circuitry comprises an input power conversion circuit configured to convert the electrical power received via the electrical plug to a bus voltage when the received electrical power is within a voltage range. In some examples, the input power conversion circuit is configured to convert to the bus voltage at least one of 100V AC, 115V AC, 200V AC, 208V ACT, 230V AC, 380V AC, 400V AC, 440V AC, 460V AC, or 575V AC. In some examples, the electrical plug is hardwired to the weld power conversion circuitry.

Disclosed examples include a welding tool and converter circuitry that is adapted to receive either utility power or generator power as input power. The converter circuitry transforms or converts the input power to welding-type power usable by a welding tool, for example.

Disclosed examples provide an operator (e.g., a welder) the ability to use the welding machine in a traditional configuration, where a welding tool is powered by running an engine-generator. Alternatively, the examples provide an operator the ability to use an external power source to power the welding tool, when available, such as utility power. Additionally, the engine-generator remains available to provide power to a different tool (e.g. a grinder, a cutting tool, a different welding tool, an air compressor, lights, etc.).

Disclosed examples include use a multi-voltage input cord and plug that is wired directly to the welding converter circuitry. The plug may be a 120V plug, a 240V plug, and/or any other appropriate plug, depending on the desired input. If weld output from the engine is desired, the operator may connect the plug into either a 120V or a 240V receptacle on the engine-driven welder. To power welding converter circuitry from an external (e.g., utility) power source, a user may unplug the welding converter circuitry from the engine-driven welder and then plug the welding converter circuitry into the external source. In contrast with conventional engine-driven welding power supplies that use utility power, disclosed example engine-driven welding-type power supplies make engine-driven generator power available for use even while the welding converter circuitry is connected to external power. In some examples, the only operator interaction required to change between external and engine power to power the welding conversion circuitry is the unplugging and plugging of the weld module cord.

Figure 1B:
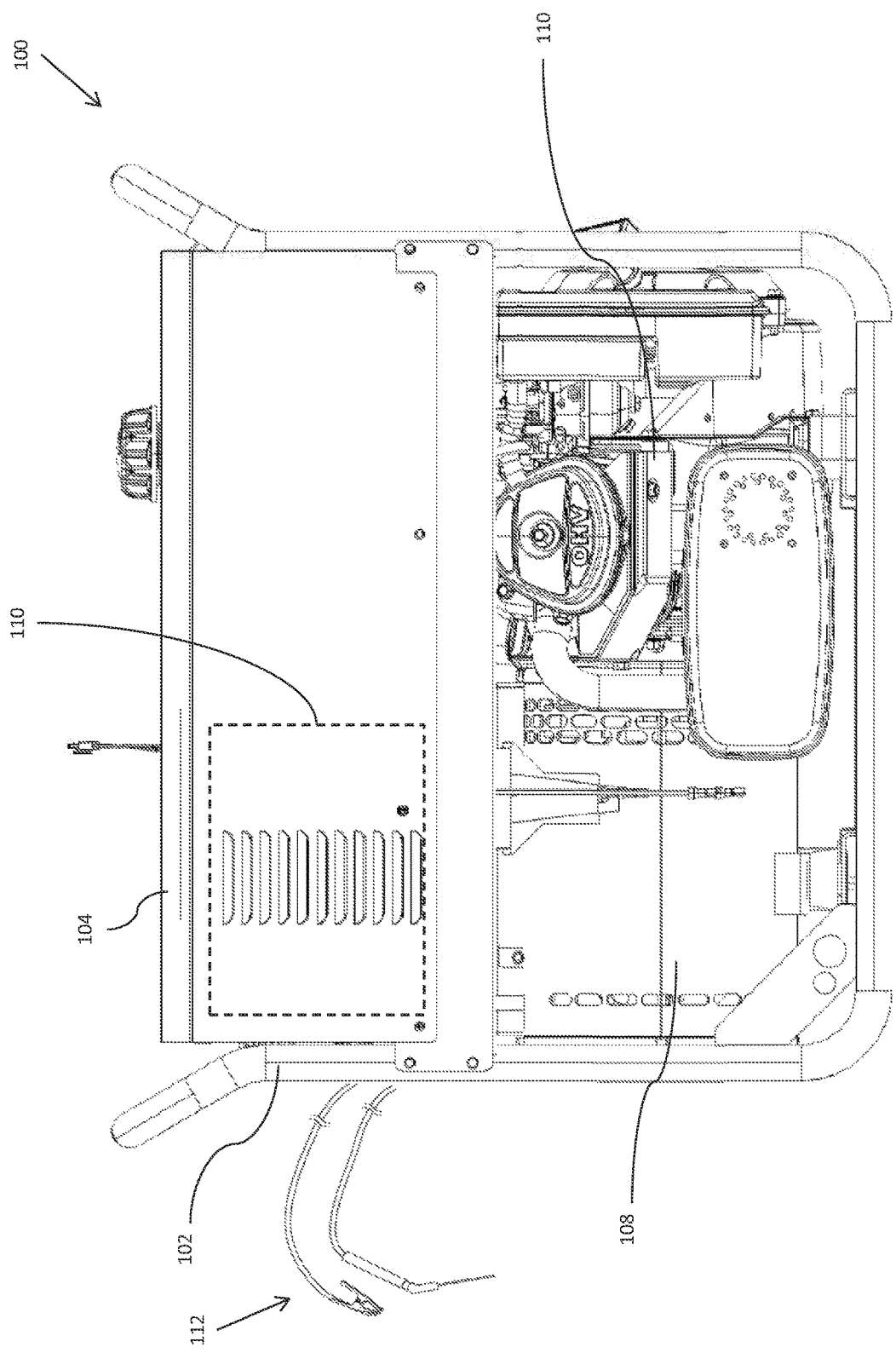

FIGS. 1a and 1b illustrate an example engine-driven welding-type power supply 100. The example engine-driven welder 100 includes a frame 102 (and/or chassis). The frame 102 includes a housing 104 (e.g., an enclosure, a shell, a casing, etc.). The engine driven-welder 100 further includes an engine 106, a generator 108, and welding conversion circuitry 110. The example housing 104 may substantially conceal and/or protect components of the engine-driven welder 100, such as the welding conversion circuitry 110, from environmental conditions and/or physical damage.

The example welding conversion circuitry 110 provides welding-type power to a welding-type torch 112. The welding-type torch 112 may be a torch suitable for gas metal arc welding (GMAW), flux cored arc welding (FCAW), shielded metal arc welding (SMAW), gas tungsten arc welding (GTAW), and/or any other arc welding tool. Alternatively, or additionally, the welding-type torch 112 may be some other device for welding, plasma cutting, induction heating, CAC-A and/or hot wire welding/preheating. The welding-type torch 112 is electrically coupled to the welding conversion circuitry 110, such as through one or more conductors, cables, wires, lines, leads, and/or other electrical connections.

The welding conversion circuitry 110 may include transformer-rectifiers, inverters, converters, resonant power supplies, quasi-resonant power supplies, switch-mode power supplies, etc., as well as control circuitry and other ancillary circuitry associated therewith. The welding conversion circuitry 110 may be capable of working with single or three phase inputs over a wide range of input voltages. The welding conversion circuitry 110 may be configured to convert and/or boost inputted electrical power to a bus voltage if the inputted electrical power is within the applicable voltage range. Example power conversion systems that may be used to implement the welding conversion circuitry 110 are described in U.S. Pat. No. 6,115,273 (Geissler), U.S. Pat. No. 7,049,546 (Thommes), U.S. Patent Publication 20090230941 (Vogel), U.S. Pat. No. 5,319,533 (Reynolds), U.S. Patent Publication 20170014932 (Henry), U.S. Patent Publication 20160303678 (Schartner), U.S. Pat. No. 9,381,592 (Schartner), U.S. Pat. No. 7,319,206 (Thommes), U.S. Pat. No. 6,849,827 (Thommes), U.S. Pat. No. 6,239,407 (Thommes), U.S. Pat. No. 6,002,103 (Thommes), U.S. Pat. No. 5,601,741 (Thommes), U.S. Patent Publication 20100193487 (Geissler), U.S. Patent Publication 20070278197 (Geissler), U.S. Patent Publication 20090266805 (Thommes), U.S. Pat. No. 6,236,014 (Ulrich), U.S. Patent Publication 20070295703 (Thommes), U.S. Pat. No. 7,235,759 (Geissler), U.S. Pat. No. 6,987,242 (Geissler), U.S. Pat. No. 6,815,639 (Geissler), U.S. Patent Publication 20020047000 (Geissler), and U.S. Pat. No. 6,329,636 (Geissler), all of which are owned by the assignee of this application, and are incorporated herein by reference.

The welding conversion circuitry 110 may be integrally coupled to the frame 102 and/or housing 104, such as with one or more brackets, for example. This coupling is such that removal and/or separation of the welding conversion circuitry 110 from the frame 102 and/or housing 104 would be substantially difficult. The welding conversion circuitry 110 may additionally, or alternatively, be substantially covered (and/or concealed, shielded, protected, etc.) by the housing 104. The engine 106 and generator 108 may also be coupled to the frame 102. The engine 106 may be an internal combustion engine, for example. The engine 106 may provide mechanical power to the generator 108. The generator 108 may convert the mechanical power to electrical power.

Figure 2:
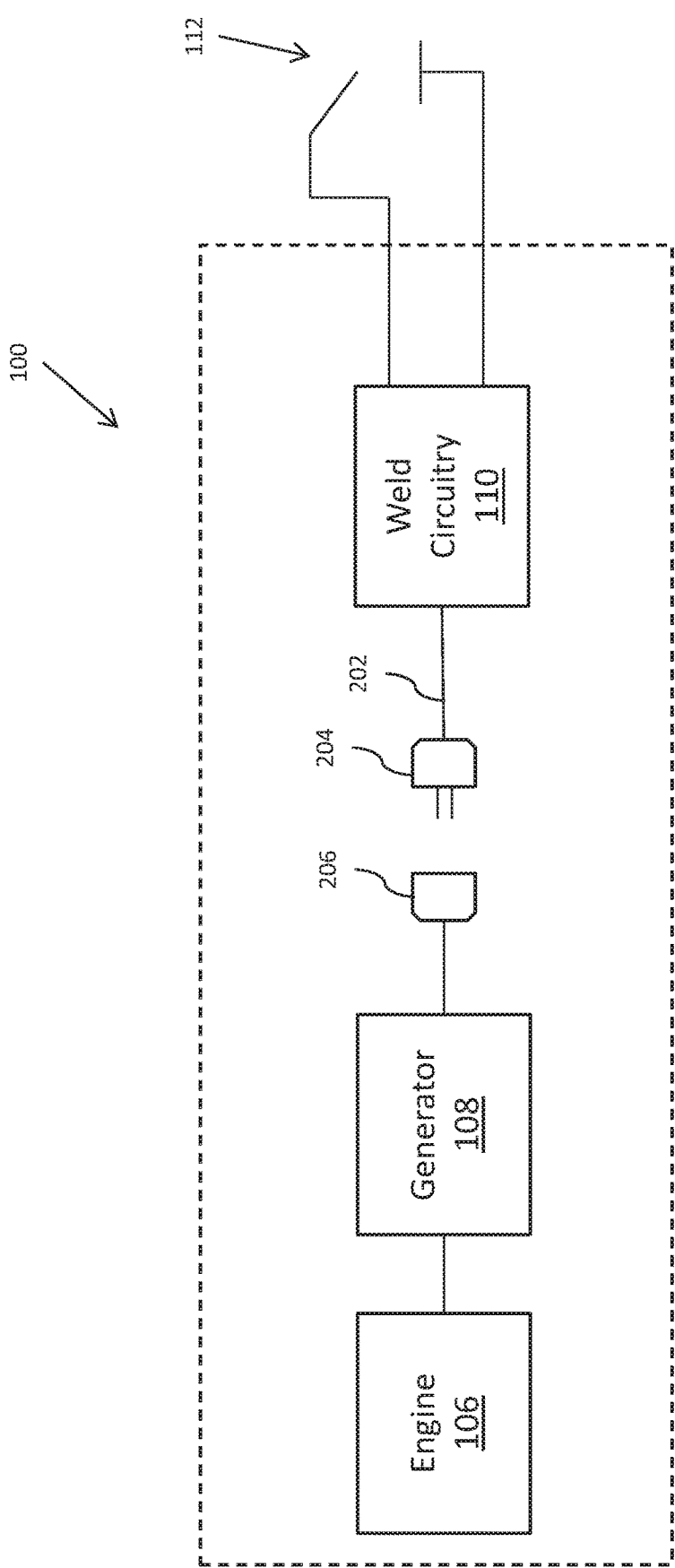

FIG. 2 is a diagram further illustrating the engine-driven welder 100. As shown in FIG. 2, the welding conversion circuitry 110 includes an electrical power conductor 202 (and/or cable, wire, line, lead, and/or other electrical power connection) configured to provide input power to the welding conversion circuitry 110. The power conductor 202 is operatively coupled to a physical electrical plug 204. The example plug 204 of FIG. 2 is configured for manual coupling to a source of electrical power (e.g., by a user), so that the plug 204 may conduct electrical current to the conductor 202 to the conversion circuitry 110. The example weld power conversion circuitry 110 converts the input power received via the power conductor 202 to welding-type power.

The generator 108 may serve as an electrical power source. The generator 108 outputs electrical power as alternating current (AC) or direct current (DC) electrical power. The generator 108 may be configured to output electrical power in a variety of voltage ranges, including, but not limited to, 100V AC/DC, 115V AC/DC, 200V AC/DC, 208V AC/DC, 230V AC/DC, 380V AC/DC, 400V AC/DC, 440V AC/DC, 460V AC/DC, and/or 575V AC/DC. The generator 108 may be configured to output single and/or three phase electrical power. The generator 108 outputs generated electrical power via an electrical receptacle 206, such as a twist lock receptacle, an electrical plug, and/or an electrical outlet, for example.

Figure 3:
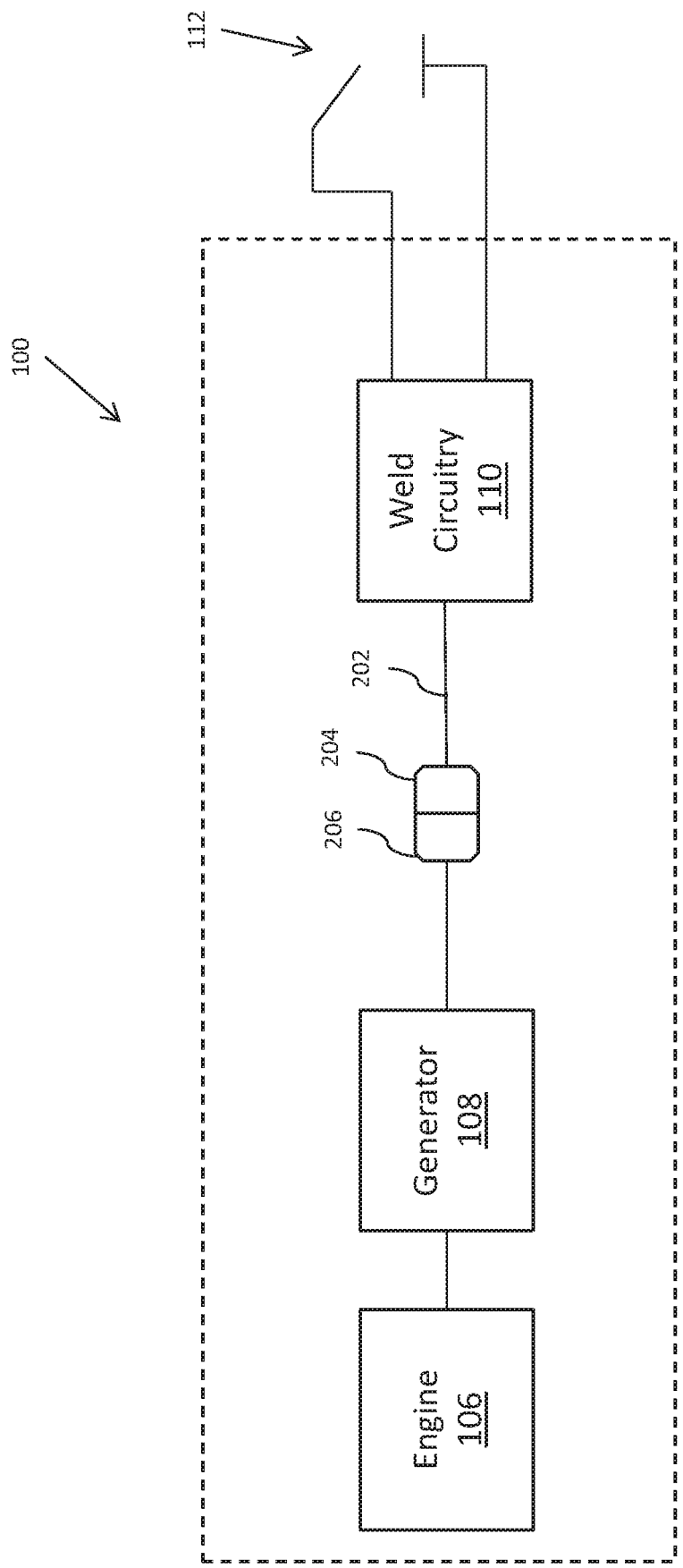

As shown in FIG. 3, the welding conversion circuitry 110 may be coupled to the generator 108 via the plug 204 and the electrical receptacle 206, during which electrical power may be conducted from the generator 108 to the welding conversion circuitry 110. The welding conversion circuitry 110 may then convert the input power received via the power conductor 202 to welding-type power.

Figure 4:
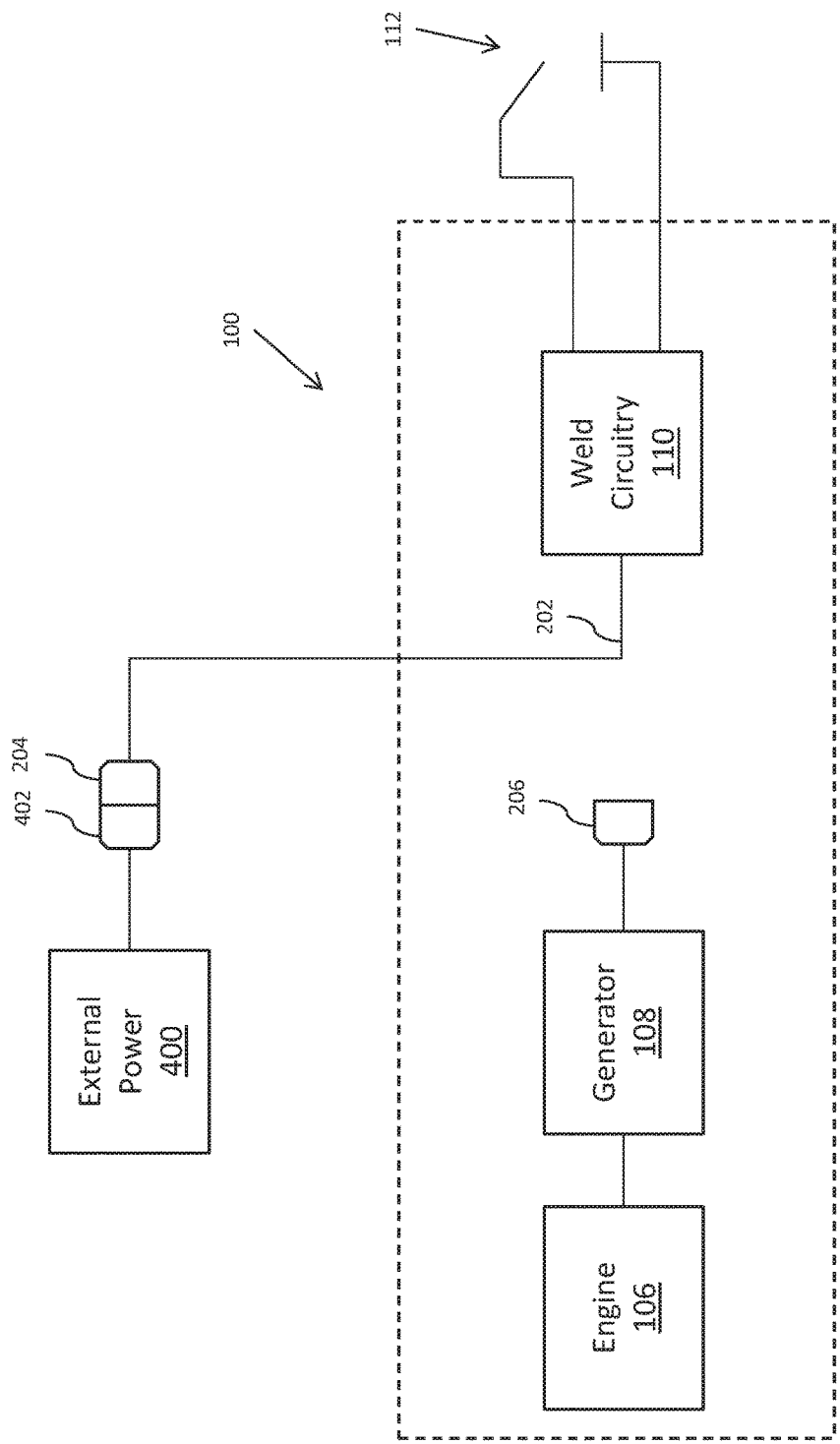

As illustrated in FIG. 4, an external electrical power source 400 outside of the engine-driven welder 100 such as, for example, a utility power source or mains power source, may also be available. The external power source 400 outputs electrical power via an electrical receptacle 402, such as an electrical plug and/or outlet, for example. As shown in FIG. 4, the welding conversion circuitry 110 may be coupled to the external power source 400 via the plug 204 and electrical receptacle 402 to provide electrical power from the external power source 400 to the welding conversion circuitry 110. The welding conversion circuitry 110 converts the input power received via the power conductor 202 to welding-type power. The welding conversion circuitry 110 may be configured to convert and/or boost the inputted electrical power to a bus voltage if the inputted electrical power is within a certain voltage range, so as to accommodate either generator 108 power or power from the external power source 400, as previously described above.

Figure 5:
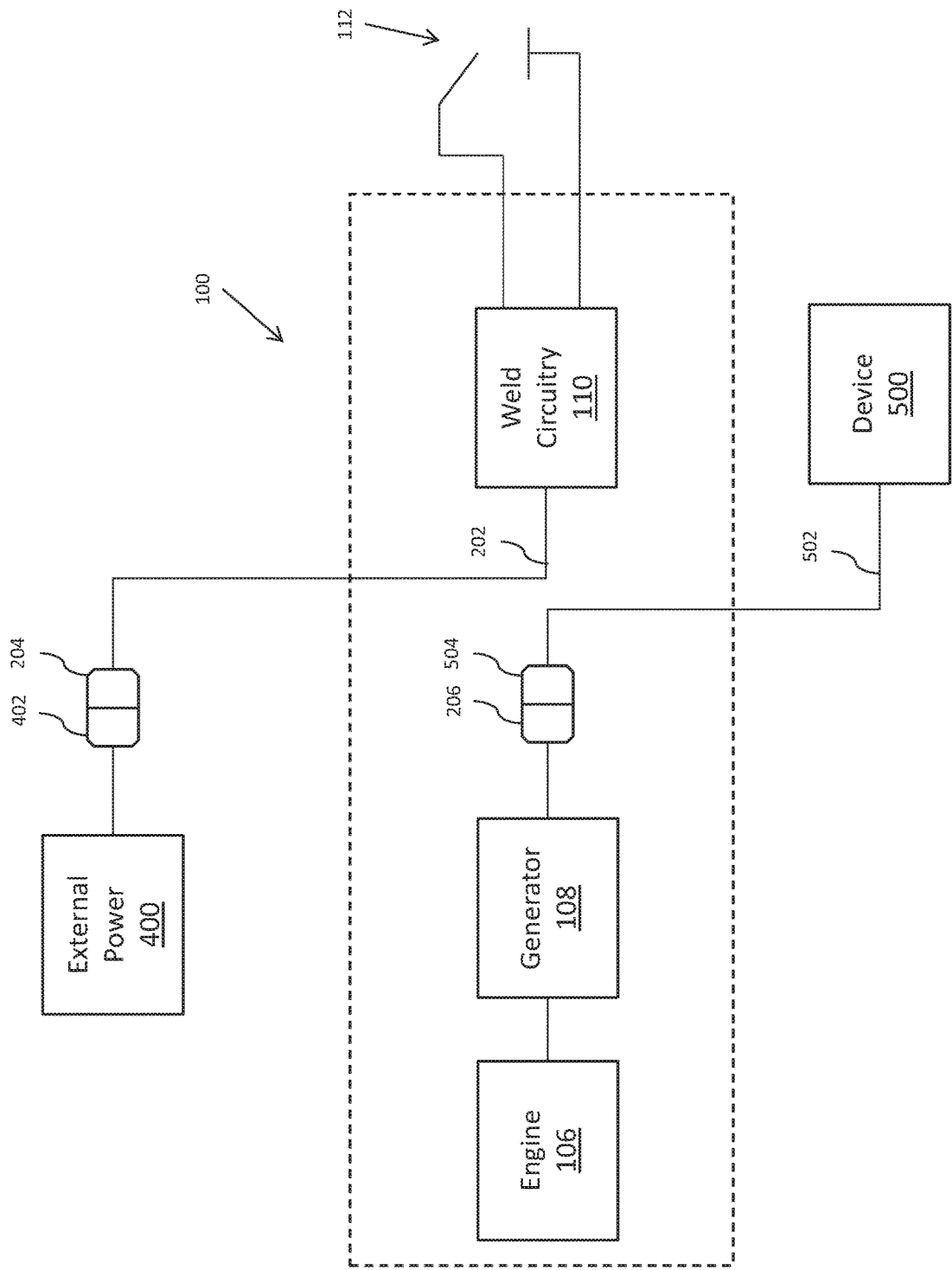
FIG. 5 is a block diagram illustrating the engine-driven welding-type power supply of FIG. 1a with a second device.

As illustrated in FIG. 5, the engine-driven welding-type power supply 100 is configured in such a way as to allow a second (and/or external) device 500 to use the generator 108 when the welding conversion circuitry 110 is using electrical power from the external power source 400. The second device 500 may be coupled to the generator 108 via a plug 504 and conductor 502. Thereafter, electrical power may be conducted from the generator 108 to the device 500. The device 500 may be any electrical device that may make use of generator power, such as, but not limited to, a grinder, a cutting tool, a different welding tool, an air compressor, and/or lights.

Thus, the engine-driven welder 100 is configured to allow an operator to perform welding operations using power from an external power source 400, such as a utility power source, while also simultaneously using electrical power from the engine 106 generator 108.

Figure 6:
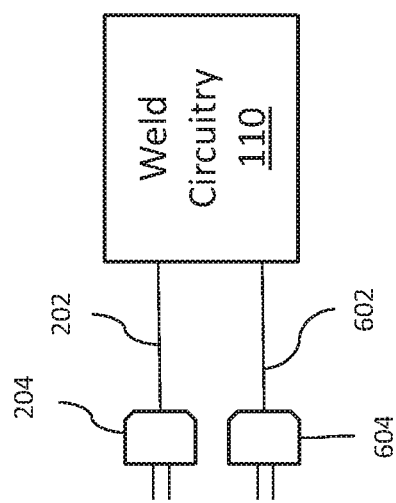
FIG. 6 is a block diagram example welding converter circuitry including a second power conductor, in accordance with aspects of this disclosure.

In some examples, the weld power conversion circuitry 110 may have a second power conductor 602 and/or second plug 604, as illustrated in FIG. 6, for example. A first power conductor 202 and a first plug 204 may be dedicated to coupling the weld power conversion circuitry 110 with the generator 108, while the other power conductor 602 and the other plug 604 may be dedicated to coupling the weld power conversion circuitry 110 with an external power source 400.

Figure 7:
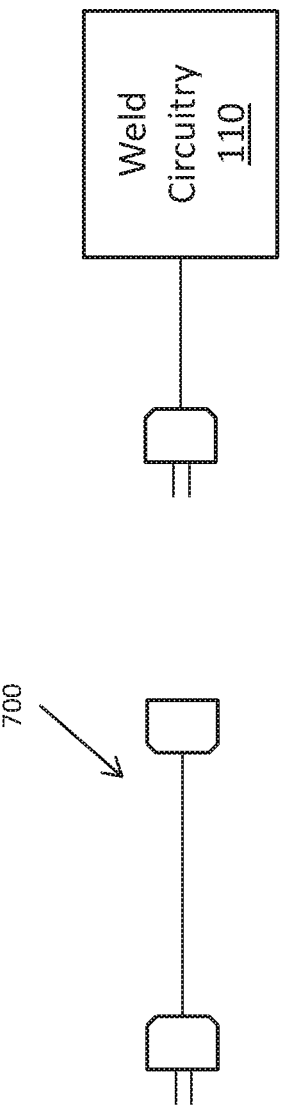
FIG. 7 is a block diagram illustrating a plug adapter.

In some embodiments, a plug adapter 700 may be used to connect the weld power conversion circuitry 110 with an electrical power source, as illustrated in FIG. 7, for example. The plug adapter 700 may be configured for single phase or three phase power, for example. The plug adapter 700 may be configured to allow connection to different electrical receptacles, such as, for example, 120 VAC or 240 VAC receptacles. The example plug adapter 700 may be a whip-type adapter that connects a receptacle with a plug using a length of conductor(s). The plug adapter 700 may omit the length of conductor and, instead, include a receptacle, conversion circuitry (e.g., a transformer, etc.), and/or a plug (e.g., a plug associated with a different voltage than the voltage of the receptacle) in a single housing. A plug adapter 700 may additionally, or alternatively, be used when connecting the generator 108 to a second device 500.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An engine-driven welding power supply, comprising:
a frame;
an engine attached to the frame;
a generator attached to the frame, wherein the generator is driven by the engine and configured to output electrical power;
weld power conversion circuitry integrally attached to the frame and configured to output welding-type power; and
a power conductor comprising an electrical plug configured to:
couple to a receptacle of the generator to provide a first input power from the generator at a first voltage to the weld conversion circuitry, and
couple to a receptacle of an external source of electrical power to provide a second input power at a second voltage, and the weld power conversion circuitry comprises an input power conversion circuit configured to automatically convert the first voltage of the first input power and the second voltage of the second input power received via the power conductor to a third bus voltage to provide the welding-type power.

2. The engine-driven welding power supply as defined in claim 1, wherein:
the generator is configured to output the electrical power as alternating current (AC) electrical power having the first voltage; and
the weld power conversion circuitry is configured to convert the electrical power received via the power conductor to the bus voltage if the received electrical power is within a given voltage range.

3. The engine-driven welding power supply as defined in claim 2, wherein the first voltage and second voltage are both between 115V AC and 230V AC.

4. The engine-driven welding power supply as defined in claim 2, wherein the first voltage and second voltage are both between the given voltage range of 100V AC and 575V AC.

5. The engine-driven welding power supply as defined in claim 1, wherein the weld power conversion circuitry comprises a switched mode power supply.

6. The engine-driven welding power supply as defined in claim 1, wherein the electrical plug of the power conductor is configured to couple to the receptacle of the external source of electrical power via a plug adapter.

7. The engine-driven welding power supply as defined in claim 1, wherein the power conductor is configured to receive both single phase and three phase power.

8. The engine-driven welding power supply as defined in claim 1, wherein the power conductor is a first power conductor, the weld power conversion circuitry configured to simultaneously obtain power from the first power conductor plugged into the generator and a second power conductor plugged into the external source of electrical power.

9. An apparatus for powering a welding tool, comprising:
a frame;
an engine attached to the frame;
a generator attached to the frame, wherein the generator is driven by the engine and configured to output electrical power as alternating current (AC) electrical power having a first voltage, the electrical power provided via a generator electrical receptacle; and
weld power conversion circuitry integrally attached to the frame and configured to convert the electrical power to a constant bus voltage output, wherein the bus voltage output is a welding-type power,
wherein the weld power conversion circuitry receives the electrical power is received via an electrical plug, wherein the electrical plug is configured to:
couple to the generator electrical receptacle,
couple to a first external electrical receptacle to receive power from an external power supply via a plug adaptor to the first external electrical receptacle, and
couple to a second electrical receptacle via the plug adaptor, wherein the first external electrical receptacle outputs electrical power at the first voltage, and the second external electrical receptacle outputs electrical power at the first voltage or a second voltage.

10. The apparatus of claim 9, wherein the generator is configured to output the electrical power to an external device when the external device is electrically connected to the first electrical receptacle and the electrical plug is coupled to the second external electrical receptacle or a third external electrical receptacle.

11. The apparatus of claim 10, wherein the external device is connected to the first electrical receptacle via a plug adapter.

12. The apparatus of claim 9, wherein the first voltage and second voltage include one or more of 100V AC, 115V AC, 200V AC, 208V AC, 230V AC, 380V AC, 400V AC, 440V AC, 460V AC, or 575V AC.

13. The apparatus of claim 9, wherein the first voltage and second voltage are one of 115V AC and 230V AC.

14. The apparatus of claim 9, wherein the weld power conversion circuitry comprises a switched mode power supply.

15. The apparatus of claim 9, wherein the electrical power is received by the weld power conversion circuitry from the electrical plug via a conductor.

16. The apparatus of claim 9, wherein the weld power conversion circuitry comprises an input power conversion circuit configured to convert the electrical power received via the electrical plug to the bus voltage when the received electrical power is within a given voltage range.

17. The apparatus of claim 16, wherein the input power conversion circuit is configured to convert to the bus voltage to at least one of 100V AC, 115V AC, 200V AC, 208V ACT, 230V AC, 380V AC, 400V AC, 440V AC, 460V AC, or 575V AC.

18. The apparatus of claim 9, wherein the electrical plug is hardwired to the weld power conversion circuitry.

* * * * *